United States Patent [19]

Krambeck et al.

[11] 3,789,267

[45] Jan. 29, 1974

[54] CHARGE COUPLED DEVICES EMPLOYING NONUNIFORM CONCENTRATIONS OF IMMOBILE CHARGE ALONG THE INFORMATION CHANNEL

[75] Inventors: Robert Harold Krambeck, South Plainfield; Robert Henry Walden, Berkeley Heights, both of N.J.

[73] Assignee: Bell Telephone Laboratories, Incorporated, Murray Hill, Berkeley Heights, N.J.

[22] Filed: June 28, 1971

[21] Appl. No.: 157,509

[52] U.S. Cl. .......... 317/235 R, 307/304, 317/235 G

[51] Int. Cl. .......... H01l 11/14

[58] Field of Search ...... 317/235 B, 235 G; 307/307

[56] References Cited

UNITED STATES PATENTS

| | | | |
|---|---|---|---|
| 3,374,406 | 3/1968 | Wallmark | 317/235 |
| 3,564,355 | 2/1971 | Lehovec | 317/235 |
| 3,697,786 | 10/1972 | Smith | 317/235 |
| 3,305,708 | 2/1967 | Ditrick | 317/235 |
| 3,621,283 | 11/1971 | Teer et al. | 317/235 |

OTHER PUBLICATIONS

BSTJ Briefs, "Charge Coupled Semiconductor Devices" by Boyle and Smith, April 1970, pages 587–593.

Electronic Design, "New Surface-Charge Transistor has High Data Storage Potential" page 28, 20 Dec. 1970.

*Primary Examiner*—Jerry D. Craig
*Attorney, Agent, or Firm*—G. W. Houseweart; Arthur J. Torsiglieri

[57] ABSTRACT

To ensure predictable directionality of charge transfer in two-phase charge coupled devices (CCD'S), the potential well associated with each half-bit must be asymmetrical so as to enhance charge transfer in the desired direction and to inhibit transfer in undesired directions. In the instant invention, localized portions of immobile charge are disposed under the CCD electrodes and, advantageously, offset with respect to the centers of the electrodes so that suitably asymmetrical potential wells are formed when a suitable voltage is applied to the electrodes. In a presently preferred embodiment, the immobile charge is provided by relatively highly doped surface zones in a semiconductor bulk portion of relatively low doping.

9 Claims, 7 Drawing Figures

INVENTORS: R.H. KRAMBECK
R.H. WALDEN
BY
Arthur J. Torsiglieri
ATTORNEY

PATENTED JAN 29 1974 3,789,267

SHEET 3 OF 3

CHARGE COUPLED DEVICES EMPLOYING NONUNIFORM CONCENTRATIONS OF IMMOBILE CHARGE ALONG THE INFORMATION CHANNEL

BACKGROUND OF THE INVENTION

This invention relates to charge coupled devices (CCD'S); and, more particularly, to CCD'S in which localized portions of immobile charge are disposed under the field-plate electrodes to enhance the unidirectionality of charge transfer.

Charge coupled devices were first described in the copending U. S. Pat. application Ser. No. 11,541, filed Feb, 16, 1970, by W. S. Boyle and G. E. Smith, now abandoned and in the copending U. S. Pat. application Ser. No. 11,448, filed on the same date by D. Kahng and E. H. Nicollian, and now U. S. Pat. No. 3,651,349, issued May 21, 1972, both applications being assigned to the assignee hereof. In these copending applications, there is disclosed a new class of devices which are adapted for storing and sequentially transferring electronic signals representing information in the form of packets of mobile charge localized in artificially-induced potential energy minima in suitable storage media, such as semiconductors, semi-insulating semiconductors, and insulators. Typically, structures in accordance with the invention disclosed in those copending applications include a plurality of metal field-plate electrodes successively disposed to form a path over an insulator which, in turn, overlies and is contiguous with the surface of the storage medium. In operation, sequential application of drive voltages to the metal field-plate electrodes induces potential energy minima in the storage medium and in which packets of mobile charge carriers can be temporarily stored and between which these packets can be transferred.

In the Boyle-Smith application there is described primarily a three-phase type of apparatus wherein the electrodes are operated in triplets and three conduction lines are employed to provide the three-phase drive voltages. Although this structure has some advantages, it is disadvantageous insofar as the three conduction paths and attendant conduction path cross-overs create undue complexities in fabrication, which tend to reduce product yield.

In partial alleviation of this problem, the aforementioned Kahng-Nicollian disclosure describes apparatus adapted for two-phase operation, the apparatus including field-plate electrodes which are nonuniformly spaced from the surface of the storage medium such that application of drive potentials to any given electrode creates an asymmetrical potential well with sufficient asymmetry to cause the requisite unidirectionality of charge propagation. Unfortunately, in such apparatus the degree of asymmetry obtainable with practical structures is not usually sufficient for optimum performance, as will be discussed in greater detail hereinbelow. Further, such structures generally rely on multiple insulator thicknesses, which also creates fabrication complexities.

To some extent, the disadvantages inherent in structures of the type disclosed in the aforementioned Kahng-Nicollian application are further alleviated in accordance with the invention disclosed in the copending U. S. application Ser. No. 85,026, filed Oct. 29, 1970, by G. E. Smith and R. J. Strain and assigned to the assignee hereof. In the Smith-Strain application there is disclosed a type of charge coupled apparatus employing two levels of electrode metallization, with every other electrode overlapping its adjacent electrodes such that the information channel is effectively sealed from contaminants and so as to be adaptable for two-phase, three-phase, and/or four-phase operation. An obvious problem inherent in the Smith-Strain disclosure is a dependence on two levels of electrode metallization, a technology which is not yet fully developed but which, however, presently appears promising.

SUMMARY OF THE INVENTION

In view of the foregoing, it is an object of this invention to ameliorate and ultimately to obviate the aforedescribed and other disadvantageous characteristics of charge coupled devices heretofore disclosed.

More specifically, it is an object of this invention to provide a more easily fabricated charge coupled device having a sufficient degree of available asymmetry to optimize the performance characteristics as presently understood.

To these and other ends, a CCD structure in accordance with the instant invention includes localized portions of immobile charge disposed under the CCD electrodes and offset with respect to the centers of the electrodes such that suitably asymmetric potential wells are formed under the electrodes when a drive voltage of sufficient magnitude is applied thereto.

More specifically, in a preferred embodiment of this invention, the localized portions of immobile charge are included in sufficient quantity and polarity such that there is produced under the electrodes an asymmetry (potential barrier) of a degree approximately one-half that of the peak-to-peak variation in surface potential caused by the particular driving voltages employed.

Still more specifically, in a presently preferred embodiment, the immobile charge is provided by localized, relatively highly doped, relatively shallow surface zones in a semiconductive storage medium of relatively low doping. In this embodiment, the asymmetry is effected when sufficient voltage is applied to the electrodes that the surface of the semiconductor is in "deep depletion" such that a substantial number of the dopants are depleted of free charge carriers, typically to a depth greater than the depth to which the relatively highly doped localized zones extend. Typically, and advantageously, such zones are relatively shallow, e.g., 2,000 angstroms, and are of well-controlled dopant concentration; and so, as discussed in more detail hereinbelow, such zones advantageously are formed by ion implantation rather than by conventional diffusion techniques which are difficult to control at such shallow depths and in the amount and controllability of dopant concentrations of interest.

Still more specifically, in an embodiment first described in the detailed description, the relatively highly doped surface zones are of the same type semiconductivity as is the semiconductive storage medium and are totally included under, but offset with respect to the geometric center of, the electrode under which they lie.

In an alternative and presently preferred specific embodiment, the relatively highly doped surface zones are of semiconductivity type opposite to that of the semiconductive storage medium, each of the zones being disposed so as to underlie a portion of two adjacent electrodes and to extend across the gap, if any, between those electrodes.

It will be appreciated in light of the detailed disclosure hereinbelow that immobile ionized charge disposed in the insulating layer also can be used in conjunction with or instead of the doped surface zones if desired, such as, for example, where the storage medium is not semiconductive.

BRIEF DESCRIPTION OF THE DRAWING

It is believed the invention, including the aforementioned and other objects, characteristics, and advantages and the invention in general, will be better understood from the following more detailed description taken in conjunction with the accompanying drawing in which.

Figure 4:
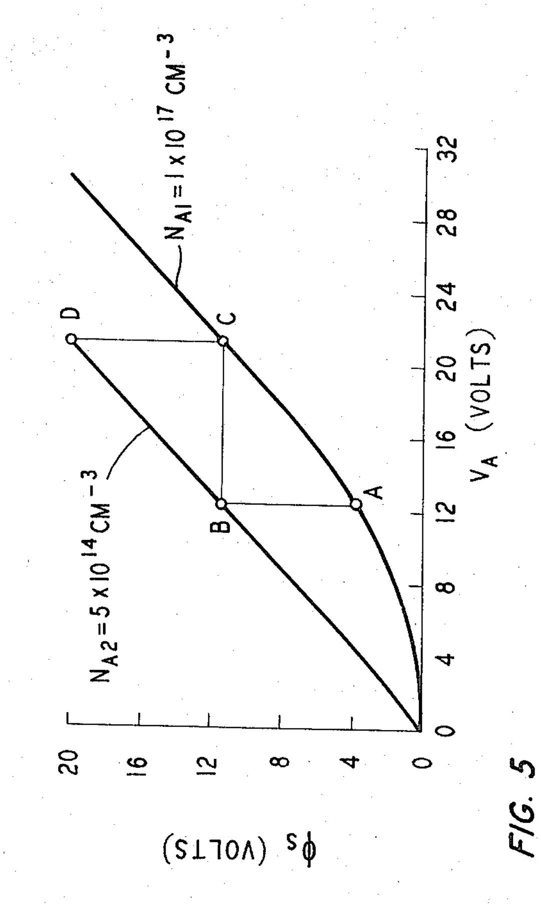
FIG. 4 is a chart depicting the surface potential as a function of applied voltage for parameters of a specific structure of the type shown in FIGS. 2 and 3.
Figure 7:
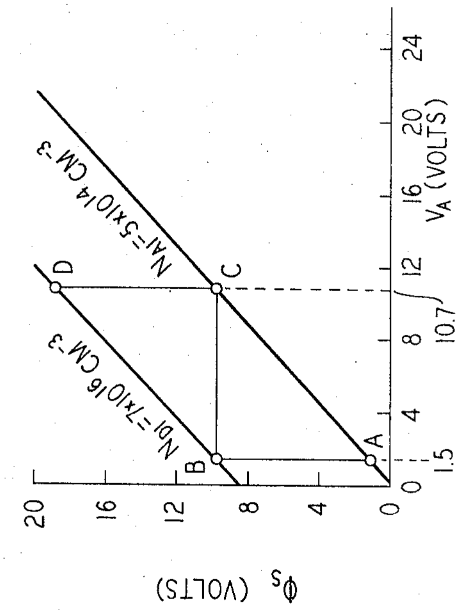
FIG. 7 is a chart depicting the surface potential as a function of applied voltage for parameters of a specific structure of the type shown in FIGS. 5 and 6.

It will be appreciated that for simplicity and clarity of explanation the figures, except for the charts in FIGS. 4 and 7, have not necessarily been drawn to scale.

DETAILED DESCRIPTION

Figures 1, 2, 3:
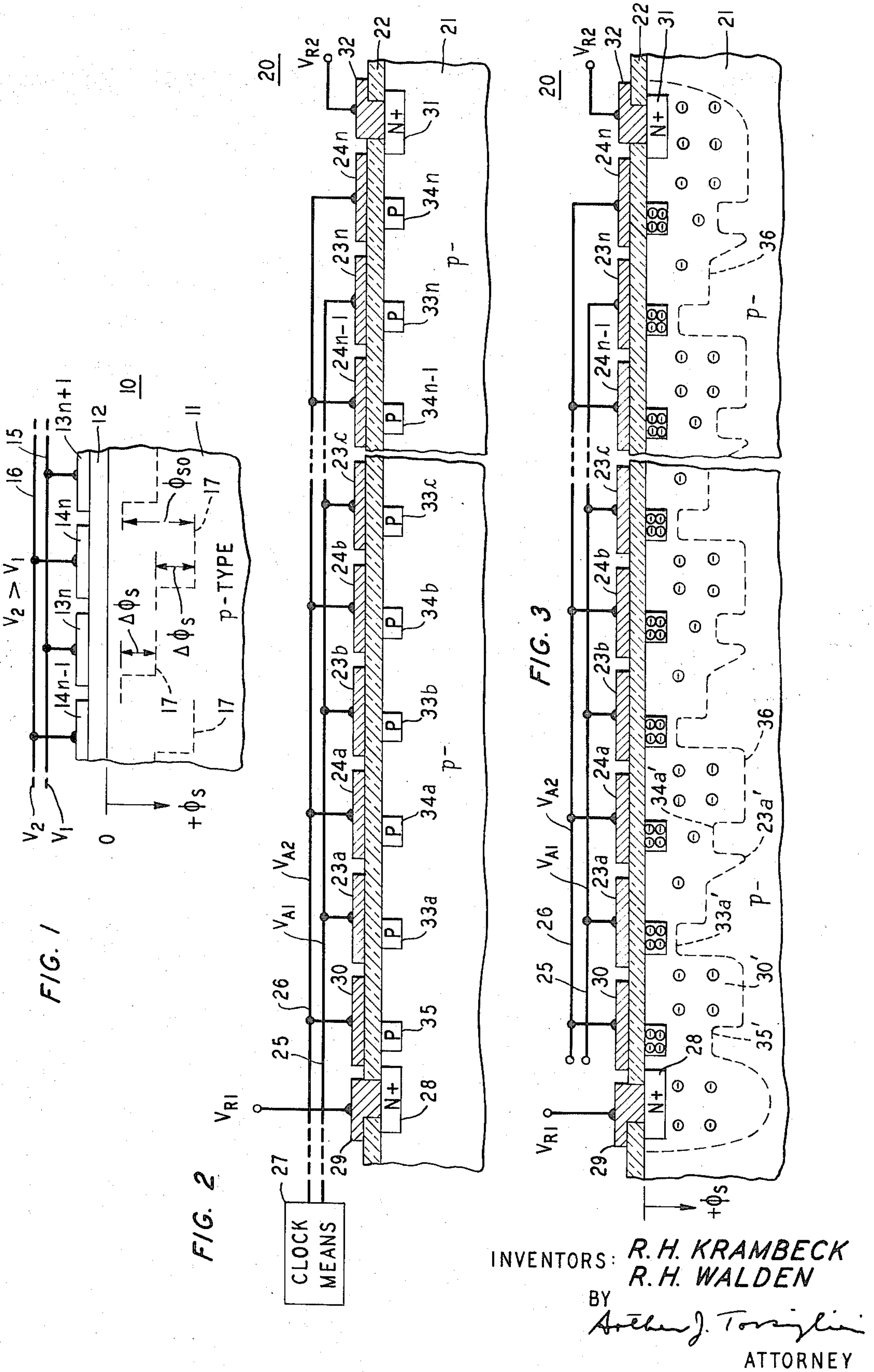
FIG. 1 is a schematic diagram of a two-phase CCD with drive voltages applied and generalized desired surface potential configurations schematically indicated.
FIG. 2 is a cross-sectional view taken along the information channel of a first embodiment of CCD apparatus in accordance with the instant invention.
FIG. 3 depicts the apparatus of FIG. 2 with a particular set of drive and reference voltages applied and further depicts schematically the approximate resultant surface potential configuration throughout the apparatus.

With more specific reference now to the drawing, FIG. 1 shows a somewhat schematic representation of a two-phase CCD apparatus 10 with drive voltages applied. In FIG. 1 the storage medium 11 is indicated, for purposes of illustration only, to be a P-type semiconductor over which there is disposed an insulating layer 12 and a plurality of electrodes $14_{n-1}$, $14_n$, and $13_{n+1}$, intermediate in a succession of like electrodes. As shown, and as is typical in two-phase CCD'S, alternate electrodes are connected to opposite ones of a pair of conduction paths 15 and 16 to which two-phase drive voltages $V_1$ and $V_2$ are applied.

As has been described heretofore, for example, in the aforementioned Kahng-Nicollian application and in the aforementioned Smith-Strain application, two-phase CCD'S typically consist of a plurality of successively disposed MIS structures, two MIS structures being used for every bit of digital information or for any particular portion of analog information represented. In such a structure, each of the MIS structures associated with each portion of stored information may be thought of as a half-bit. Two-phase operation, then, implies that corresponding half-bits are driven with a voltage which is at least some percentage of a clock period out of phase with that voltage driving the other half-bits. And as known heretofore, in order to provide predictable directionality of charge propagation, the individual half-bits must possess barriers to mobile charge motion in the reverse direction.

Although no structure is shown in FIG. 1 to produce asymmetry in the potential wells so as to provide the barriers to mobile charge motion in the reverse direction, there is depicted in the storage medium portion 11 of FIG. 1 by broken lines 17 a somewhat schematic representation of the surface potential $\phi_S$ which would be advantageous in a two-phase device. As shown, the barriers to inhibit reverse charge motion are of height $\Delta\phi_S$. It will be appreciated that the magnitude of this barrier height, $\Delta\phi_S$, in conjunction with the lateral extent of the potential well with which it is associated, determines the maximum signal charge carrying capability of the CCD.

For optimum performance and, in particular, to maximize the operating speed and charge storage capability at each storage site, it has been found that the barrier should be as narrow as possible (but not sufficiently narrow to allow tunneling in the reverse direction), and the charge capacity should be as large as can be used with available driving potentials, and, further, that the surface mobility of the mobile charge carriers used to represent signal information should be as high as possible.

It is known that in most semiconductive materials of interest the surface mobility of N-channel devices, i.e., devices wherein electrons are the mobile charge carriers, and in which the electrons flow through an inversion layer in an otherwise P-type substrate, is higher than the surface mobility for the other type of device, i.e., a P-channel device, in which the mobile charge carriers are holes which flow through an inversion layer in an otherwise N-type semiconductive material. In silicon, for example, it is known that this advantage in carrier mobility is of the order of about 5 to 1. Accordingly, the detailed descriptions hereinbelow will be given in terms of the preferred N-channel devices, although it will, of course, be appreciated that the principles discussed are equally applicable to P-channel devices, provided appropriate reversals of drive voltage polarities is made.

In addition to having the barrier as narrow as possible, it will be appreciated that, for maximum charge storage capability at each storage site, the barrier height $\Delta\phi_S$ should be adjusted in relation to the peak-to-peak variation in surface potential, labeled $\phi_{SO}$ in FIG. 1; and in particular, for a given $\phi_{SO}$, $\Delta\phi_S$ should be approximately one-half $\phi_{SO}$ for maximum charge storage capability. If $\Delta\phi_S$ is less than one-half $\phi_{SO}$, the usable storage site (to the right of the barrier under each electrode) will accommodate less than a maximum amount of charge. Conversely, if $\Delta\phi_S$ is greater than one-half $\phi_{SO}$, more than the maximum amount of transferrable charge is stored; however, the amount of charge which can be transferred over the barrier to the right is less than the maximum amount which could be transferred.

Taking into account this fact that $\Delta\phi_S$ should be approximately one-half $\phi_{SO}$ and further taking into account the fact that, with the useful insulating layer thicknesses conveniently available at present, the operating voltages one can anticipate as being practical range from about 5 to about 20 or more volts, it is seen that optimum barriers to prevent charge propagation advantageously should lie from 2.5 to about 10 or more volts.

One can conceive of a variety of schemes for producing barriers based on differences in work function between the electrodes and the storage medium used, and also, of course, as disclosed in detail in the aforementioned Kahng-Nicollian application, based on the use of oxides having different dielectric constants and also the use of stepped oxides wherein portions of each CCD electrode are disposed at varying distances from the surface of the storage medium. However, our analysis of the problem has shown that with presently available technologies and materials none of these techniques can readily be made to provide sufficiently high barriers to optimize the performance in accordance with the discussion immediately above.

Analysis of the various means which can be employed to effect the surface portion of an MIS structure for a given applied voltage indicates that for an MIS structure in deep depletion the greatest variation in surface potential to produce barriers to prevent reverse charge motion is realizable through variations in the doping density of the storage medium adjacent the semiconductor insulator interface, inasmuch as the doping density can conveniently be made to vary over a very wide range, for example, 5 or more orders of magnitude.

Thus, applying this concept and in accordance with the instant invention, in FIG. 2 there is shown a first embodiment of a two-phase charge coupled device employing relatively highly doped localized zones adjacent the semiconductor dielectric interface to effect lateral nonuniformities in surface potential for given applied voltages.

More specifically, in FIG. 2, there is shown a cross-section 20 of an N-channel CCD having a storage medium 21, the bulk of which is of relatively lightly doped P-type semiconductive material over which there is disposed a substantially uniform insulating layer 22.

A plurality of field-plate electrodes **23*a*, 24*a*, 23*b*, 24*b*...23*n*, and 24*n* are shown disposed successively over insulator 22 so as to form a path, i.e., an information channel, along which mobile charge carriers representing information can be temporarily stored and transferred by application of appropriate drive voltages to these field-plate electrodes. Further, as shown in FIG. 2, the electrodes numbered 23 are all connected to a common one, 25, of a pair of conduction paths 25 and 26 to which appropriate drive voltages are applied by a clock means 27. The other field-plate electrodes, numbered 24, are connected to the other clock line 26**.

Pulses representing information are coupled into the information channel, which begins under electrode **23*a*, by means of an input portion which includes a localized $N^+$-type zone 28 in combination with an electrode 29 which makes a low resistance contact thereto, a source of potential $V_{R1}$, and a gating electrode 30 which is shown connected to clock line 26. Gating electrode 30 is shown connected to clock line 26** for purposes of illustration only, because, as discussed hereinbelow, there are other modes of practical operation.

Also shown in FIG. 2 is an output portion including a localized $N^+$-type zone 31 disposed near the last field-plate electrode **24*n* in combination with an electrode 32 which makes low resistance contact to zone 31, and a source of reference potential $V_{R2}$ which is maintained sufficiently positive that zone 31 and the depletion region associated therewith acts as a collector of any charge carriers which ultimately are transferred into the potential well under electrode 24*n***.

Further shown in FIG. 2 and in accordance with this invention are a plurality of relatively highly doped, relatively shallow $P^+$-type surface zones **33*a*, 34*a*, . . . 34*n*, one being disposed under the leading portion, i.e., the left-most portion, of each of the field-plate electrodes 23 and 24. As will be discussed in more detail below, the inclusion of zones 33 and 34 causes a substantial asymmetry in potential wells formed under the electrodes whenever sufficient voltages are applied thereto. For this reason, and because no extra fabrication steps are required, an additional similarly relatively highly doped P-type zone 35 also is included under gating electrode 30 so as to enhance unidirectionality of charge propagation from source 28 to the storage site under electrode 23*a***.

With reference now to FIG. 3, there is depicted the apparatus of FIG. 2 with drive and reference voltages applied; and there is further depicted schematically by broken line 36 the approximate surface potential occurring throughout the apparatus with particular clock voltages $V_{A1}$ and $V_{A2}$ applied to clock lines 25 and 26. In the discussions of operation immediately below and elsewhere in this specification it is assumed that the storage medium 21 is connected to ground potential unless otherwise indicated. Of course the storage medium need not be connected to ground potential but may instead be connected to any fixed reference potential or may even be left floating provided the clock voltages and other applied voltages are scaled appropriately.

Specifically now, in FIG. 3, it is assumed that the voltages applied to clock lines 25 and 26 are positive and that the magnitude of the voltage $V_{A1}$ applied to clock line 25 is less than the magnitude of the voltage $V_{A2}$ applied to clock line 26. It will be appreciated that in FIG. 3 both of the voltages applied to clock lines 25 and 26 are of sufficient magnitude to cause the entire apparatus to be always in sufficiently deep depletion that the surface portion of the entire information channel is depleted of free charge carriers to a depth greater than the depth to which the relatively highly doped localized zones 33, 34, and 35 extend. Depletion to this extent is not essential to this invention but is presently preferred, as is discussed in greater detail hereinbelow. In this mode of operation, there is exposed near the surface substantially all of the ionized acceptors in the localized zones 33, 34, and 35.

Herein lies the essence of the instant invention with respect to this embodiment. Because the density of the ionized acceptors in the localized zones 33, 34, and 35 is greater than the density of the ionized acceptors elsewhere along the surface, there is produced an asymmetry in the surface potential under each of the electrodes, the degree of asymmetry being proportional to the difference in density between the ionized acceptors.

Before completing the description of the operation of the apparatus of FIG. 3, reference is made first to FIG.

4 where there is shown a plot of surface potential in a device of the type depicted in FIGS. 2 and 3 as a function of applied voltage. In this plot it is assumed no mobile charge carriers have been introduced into the potential wells. A curve of the type shown in FIG. 4 is produced by a straightforward solution of Poisson's equation to give surface potential $\phi_s$ as a function of applied voltage $V_A$. In the analysis used to derive the curves of FIG. 4, it is assumed that the relatively highly doped surface zones 33, 34, and 35 are characterized by a constant doping density $N_{A1}$ and a well-defined depth $X_1$ and that the relatively lower background doping density in bulk portion 21 is a constant $N_{A2}$. With these assumptions, the resulting expressions in solution of Poisson's equation are: $V_A = \phi_s + V_1 (\phi_s/\phi_{s1})^{1/2}; x_d \leq x_1$ $$V_A = \phi_s + V_1 - V_2 \left\{1 - \sqrt{1 + (N_{A1}/N_{A2}) [(\phi_s/\phi_{s1}) - 1]}\right\}, x_d \geq x_1$$

where $$V_1 = (e x_1 d N_{A1}/\epsilon_{ox});$$

$$V_2 = (e x_1 d N_{A2}/\epsilon_{ox});$$

$$\phi_{s1} = (e x_1^2 N_{A1}/2\epsilon_s);$$

$e$ = electronic charge = $1.6 \times 10^{-19}$ coulombs;
$\epsilon_s$ = permittivity of storage medium = $1.06 \times 10^{-12}$ farads per centimeter for silicon;
$\epsilon_{ox}$ = permittivity of dielectric = $3.45 \times 10^{-13}$ farads per centimeter for silicon dioxide
$d$ = thickness of dielectric.

In these equations the parameters $\phi_{s1}$ and $V_1$ are the voltage drops across the silicon depletion region and the insulator 22, respectively, when the depletion layer width, $X_d$, is the same as $X_1$. And more specifically as indicated in FIG. 4, the particular curves shown are plotted for a case where $N_{A1} = 1 \times 10^{17}$ per cubic centimeter, $N_{A2} = 5 \times 10^{14}$ per cubic centimeter, $X_1 = 2 \times 10^{-5}$ centimeters, and the thickness, $d$, of insulator 22 is 1,000 angstroms, i.e., $1 \times 10^{-5}$ centimeters.

As will be observed from the curves of FIG. 4, the curves have two regions of distinctly different behavior of surface potential with applied voltage. The first of such regions extends from the origin of the curve to a knee, designated A, on the curve for $N_{A1}$ and in this region surface potential $\phi_s$ varies slowly with respect to $V_A$ and corresponds to the condition in which the depletion depth $X_d$ is less than the depth $X_1$ of the relatively highly doped surfaces zones. The knee in the curve, at point A, occurs at the condition in which $X_d$ is equal to $X_1$. Beyond the knee, the curve is nearly linear and corresponds to the condition in which the depletion width $X_d$ is greater than the the depth of $X_1$, to which the relatively heavily doped zones extend.

A special aspect of the instant invention is an appreciation that it is the linear portion of the curves of FIG. 4 on which the apparatus generally should be operated for optimum performance. As presently understood, the reason for operating on the linear portion of the curves is that it is the vertical distance between the curve for $N_{A1}$ and the curve for $N_{A2}$ which determines the barrier height $\Delta\phi_s$ previously discussed with reference to FIG. 1; and it is this barrier height which prevents charge from leaking in the reverse direction across the barrier.

If the nonlinear portion of the curve is utilized, it will be appreciated from an analysis of FIG. 4 that the barrier $\Delta\phi_s$ will decrease in size during the transfer of charge so that, at least in principle, the driving voltage wave form would have to be tailored in shape and magnitude to ensure that the barrier is always high enough to prevent reverse propagation of charge. Of course, the use of such tailored wave shapes may add unnecessary complexities to the operation of the apparatus; and so it will be, in most cases, advantageous to operate on the linear portions of the curves.

However, a practical consideration at this point is that operation with the relatively heavily doped zones only partially depleted is not as much of a problem as theory would suggest because in practice the driving clock voltage waveforms are never truly square-waves, but are somewhat degraded into trapezoidal shape; and this degradation tends to offset the effect of the shrinkage in barrier height. Also, of course, it should be recognized that the relatively heavily doped zones can be extended very deeply into the semiconductor so that they are never completely depleted to their full extent, provided one is willing, in that case, to adapt his clock voltages for operation always on the nonlinear portion of the curves. However, it is reiterated that operation on the linear portion of the curves is preferred.

From a more detailed consideration, now, of the equations previously set forth, it will be appreciated that the effect of increasing $X_1$ for a given value of $N_{A1}$ is to shift the linear portion of the curve to higher values of $V_A$ for a given surface potential $\phi_s$. The amount of shift depends upon the charge per unit area in the heavily doped region. Since it is the linear portion of the curve which is most advantageous when square-wave or sinusoidal-type clock voltages are employed, and since the total charge in the heavily doped region can be regulated by varying $N_{A1}$, it is desirable to keep $X_1$ small, e.g., typically about 2,000 angstroms ($2 \times 10^{-5}$ centimeters). Another reason for keeping $X_1$ small is that, as is well known by those in the semiconductor art, the total amount of charge required to bring about avalanche breakdown for a given applied voltage is greater for smaller values of $X_1$.

Referring back now to FIG. 3, it is seen that the surface potential under each of the electrodes includes a barrier, 35', 33a', 34a', etc., of lesser surface potential underneath the relatively heavily doped zones 33, 34, and 35 and that the effective potential well utilizable for storing mobile charge representing signal information lies to the right of the barrier and extends approximately to the leading edge of the barrier under the next succeeding electrode. And further, it is seen that the greater voltage applied to clock line 26 is of sufficient magnitude that the entire potential well under each electrode 24 (and under electrode 30) is slightly deeper than any portion of the potential well under the adjacent electrodes 23. Advantageously, to minimize power dissipation, clock voltages $V_{A1}$ and $V_{A2}$ should be adjusted such that the top of the barrier of the deeper potential wells is exactly the same potential as the bottom of the shallower potential wells.

In operation, with the driving potentials applied as shown in FIG. 3 to clock lines 25 and 26, if the potential at the input, $V_{R1}$, is abruptly pulsed to a less positive value so as to forward bias the portion of the PN junction associated with input zone 28 at the surface in the region adjacent to the leading edge of electrode 30, that zone will operate as an emitter to inject charge into the potential well under gating electrode 30. Inasmuch as gating electrode 30 is connected to the clock line 26, the surface potential under electrode 30 is at all points more positive than the surface potential under electrode 23a. Accordingly, electrons injected from input zone 28 will be collected in the storage site 30' under electrode 30 which is a local potential energy minimum for electrons, i.e., a point of locally most positive surface potentials.

The surface potentials indicated in FIG. 3 are, of course, those surface potentials at an instance in time immediately after application of voltages to the clock lines and, as depicted, do not account for surface potential effects which are caused by mobile charge representing information in the potential wells. The effect of such mobile charge, electrons in the case of an N-channel device as depicted, will be to decrease the surface potential at the storage site. More particularly, as each electron is drawn into a potential well, the surface potential there decreases; and, accordingly, the maximum practical amount of mobile charge which can be stored in any given storage site (potential well) is that amount which decreases the surface potential of the storage site nearly to the surface potential at the top of the barrier associated with that storage site. Any additional mobile charge in any potential well would tend to "leak" in the reverse direction and/or the forward direction with resultant loss of signal integrity.

In view of the foregoing, it will be appreciated that electrons will be injected from zone 28 into the potential well under electrode 30 until the effect of such electrons on the surface potential under electrode 30 is sufficient to decrease that surface potential approximately to the potential of zone 28. Thus during injection, the potential of zone 28 advantageously is adjusted to be more positive than the top of the barrier 33a' under electrode *23a* to avoid "flooding" the channel with electrons. Note, however, that provided the above-mentioned "flooding" is avoided, it is not necessary to adjust the potential of zone 28 to avoid simply over-filling the storage site 30' under electrode 30 because if the pulse is removed from zone 28 before the clock cycle is reversed, any excess carriers in storage site 30' will flow backward (to the left) over barrier 35', leaving only a sufficient amount of charge in 30' to decrease the surface potential there nearly to that of the top of barrier 35'.

Alternatively, of course, it will be understood that the input electrode 29 could be connected to ground potential, to which the substrate 21 also is connected, or to some other fixed potential, in which case gating electrode 30 would not be connected to conductor path 26 but would be connected to a separate source of pulsed potential for enabling or inhibiting the flow of a packet of charge from source 28. In either mode of operation the duration of the pulse applied either to $V_{R1}$ or to gate 30 can be used to determine the amount of charge transferred to represent information. Accordingly, analog or digital operation can be effected by application of the analog or digital signal either to zone 28 or to gating electrode 30.

It will be appreciated that this mode of operation in which gate electrode 30 is pulsed is analogous to this situation in which gating electrode 30 is used as the gating electrode of an insulated gate field-effect transistor, source 28 operates as the source of that transistor, and the potential well under the right-most part of electrode 30 operates as a "phantom" drain to pull electrons from source 28.

Assume now that a quantity of electrons have been injected into the storage site 30' under electrode 30. In this condition, when the clock voltages are reversed, i.e., when the alternate phases are applied to conduction paths 25 and 26 such that conduction path 25 is more positive than conduction path 26, the surface potential configuration under electrodes 23 will retain their shapes indicated in FIG. 3 but will be translated to a more positive value, i.e., will translate downward in FIG. 3; and, of course, the surface potential configuration under electrodes 24 will remain the same but will be reduced, i.e., will translate upward in FIG. 3. Accordingly, at the reversal of the clock phases the potential wells under electrodes 23 will become more positive than the potential wells under electrodes 24; and, accordingly, charge previously stored in the potential wells under electrodes 24 and 30 will be drawn one step to the right into the potential wells under electrodes 23.

It will be appreciated at this point that if complete transfer of charge is desired, the applied voltages must be sufficient that the surface potential of the tops of the barriers in the deeper wells is at least as positive as the surface potential at the bottoms of the shallower wells. Complete transfer is not essential for operation, however; and, in fact, it is often advantageous to operate such that a constant amount of background charge is never transferred. Such operation has been found to reduce signal distortion.

Of course, even if one attempts to operate with complete charge transfer, some of the mobile charge will always be trapped in the potential "dips", e.g., *23a'*, which occur immediately to the left of the electrodes with the greater applied voltage (electrodes 24 in FIG. 3). However, it will be seen that this is not a problem and will not have a deleterious effect on signal performance, provided the storage capacity of the "dips" is kept relatively small with respect to the storage capacity of the primary storage sites under the electrodes. This trapped charge is not a problem, because the same amount of charge will be trapped there each time charge transfer takes place; and this trapped charge cannot propagate in either direction because of the barriers, e.g., 33a' and 34a', immediately to the left and to the right. Thus, this small quantity of charge will remain constant after a first cycle of operation and, being constant, will have no effect on amounts of mobile charge representing information which pass therethrough.

To complete the description of the operation of the apparatus of FIG. 3, at each subsequent reversal of the clock phases any mobile charge stored in the potential wells will likewise move one step to the right, until eventually a packet of charge will be transferred under the last electrode 24 and in which case it will be drawn into the more positive $N^+$ zone 31. Thus, it is seen that $N^+$ zone 31 acts analogous to a collector in an ordinary transistor; and, accordingly, any charge drawn thereinto will manifest itself as a current flowing through the circuit attached to electrode 32 and can be detected by any of a variety of means by now well known in the art.

At this point it should be appreciated that the structures indicated in FIGS. 2 and 3 are intended to depict practical structures which can be made. Ideally, of course, for maximizing the amount of charge which can be stored under a given electrode, zones 33 and 34 should be as narrow as possible (consistent with disallowing tunneling in the reverse direction) and, further, should be located immediately under the leading edge of their respective electrodes to maximize the effective area of the charge storage site, e.g., 30'. However, in practice, infinitely thin zones cannot be formed; nor can absolute precision in registration of zones with respect to electrodes be realized. It is for this reason, and for the operational reason discussed immediately below, that zones 33 and 34 have been depicted as lying slightly to the right of the leading edge of their respective electrodes and have been shown to have a finite width of nearly half the lateral extent of the electrodes.

More specifically, a structure of the type shown in FIG. 2, designed with conventional minimum manufacturing tolerances presently realizable, would have, for example, a lateral electrode dimension of about 20 microns ($2 \times 10^{-3}$ centimeters); the spacing between electrodes would be about 10 microns; the distance by which zones 33 and 34 are indented from the leading edge of their respective electrodes would be about 5 microns; and the lateral extent of zones 33 and 34 would be about 5 microns. Thus, a bit of information, requiring two half-bits, i.e., two electrodes, would require, under these design rules, a total lateral extent of about 60 microns.

Such a structure has actually been reduced to practice with $N_{A1} = 1 \times 10^{17}$ acceptors per cubic centimeter; $N_{A2} = 1 \times 10^{14}$ acceptors per cubic centimeter; electrode length = 25 microns ($2.5 \times 10^{-3}$ centimeters); and electrode spacing = 5 microns ($5 \times 10^{-4}$ centimeters). The structure had a flatband voltage of about minus 2.5 volts; and clock voltages alternating between zero and 10 volts were used. The structure operated at frequencies up to 6.5 MHz with losses due to incomplete charge transfer less than one-tenth percent per transfer. At 17 MHz, losses were about 2 percent per transfer. And, at the lower end of the usable frequency band, there were no detectable loss at frequencies as low as one kHz.

As intimated above, there is also an operational reason for having zones 33 and 34 be of finite lateral extent where relatively small electrodes are employed. In this context, "relatively small" is taken to mean a lateral dimension of about the same as or not much greater than the depth to which the depletion regions in operation extend into the storage medium. This operational advantage is disclosed in more detail in the copending U. S. application Ser. No. 157,507, filed of even date herewith, and disclosing the advantages of graded immobile distributions to provide, among other things, field-enhanced transfer of charge. As disclosed in the aforementioned Amelio et al application, for small electrodes a linear gradient of immobile charge can be approximated by one-step approximation. As related to this disclosure, the P-type zones 33 and 34 can be considered as approximating the linear gradient.

More specifically now with respect to the actual fabrication of zones 33 and 34, it will be appreciated that for controlled operation the amount of dopant impurities introduced into each of such zones must be well controlled; and, further, to enable complete depletion of such zones at practical operating voltage they advantageously are very shallow. Of course, it is known that the methods of ion implantation are readily adaptable to producing well-controlled, uniform dosages of dopant impurities and relatively shallow zones. Of course, although ion implanation is preferred, it need not be used. Rather, a doped oxide technology or a standard solid state gaseous diffusion can be employed with, nevertheless, some decrease in uniformity of results.

Figure 5:
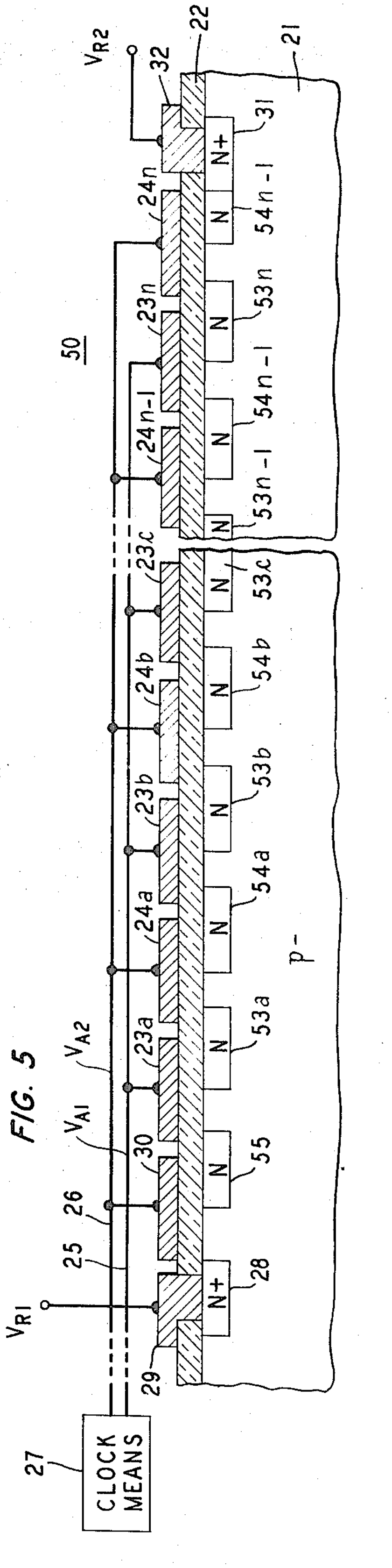
FIG. 5; is a cross-sectional view taken along the information channel of a CCD in accordance with a second embodiment of this invention.

With reference now to FIG. 5, there is shown an alternative and, in some respects, presently preferred way of realizing a two-phase charge coupled device utilizing nonuniform concentrations of dopant impurities adjacent the storage medium-dielectric interface. More particularly, in FIG. 5 there is shown a cross-sectional view taken along the information channel of two-phase charge coupled 50, similar in all respects to that depicted in FIGS. 2 and 3, except that, instead of having relatively narrow zones of relatively heavy P-type doping under each half-bit where the barrier is desired, there is disposed in all other portions of the semiconductor surface along which this cross-section is taken zones **53*a*, 54*a* . . . 53*n*, 54*n*, and 55 of N-type doping. Inasmuch as the only differences between FIGS. 2 and 5 are in the zones adjacent the surface, most of the reference numerals used in FIGS. 2 and 3, except for numerals designating these zones, have been repeated in FIG. 5**.

Figure 6:
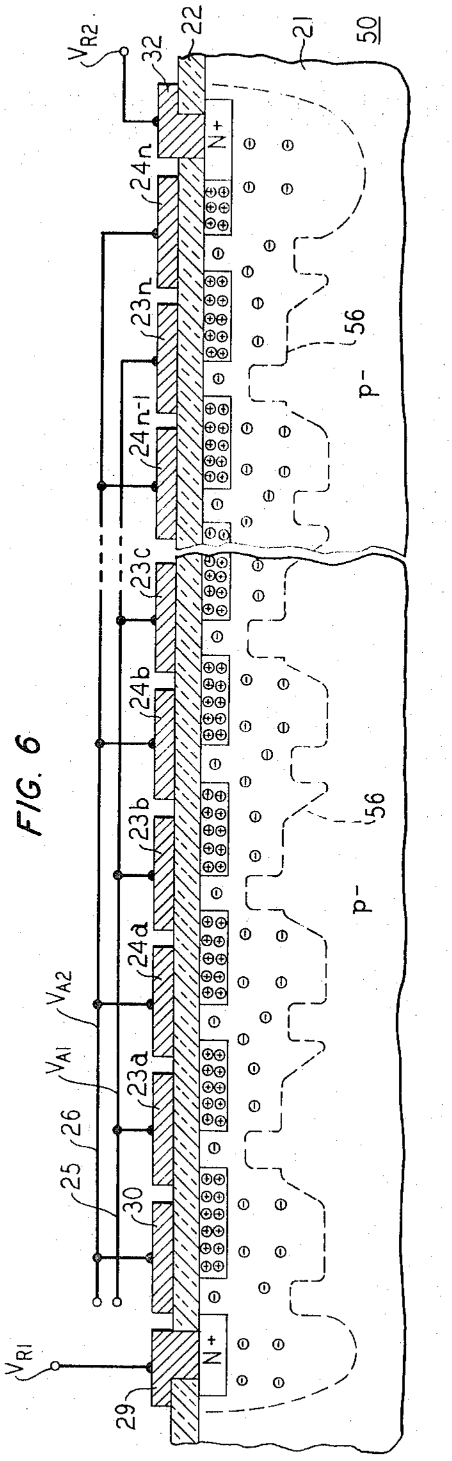
FIG. 6 depicts the apparatus of FIG. 5 with a particular set of drive and reference voltages applied and further depicts schematically the approximate resultant surface potential configuration throughout the apparatus.

In FIG. 6 there is shown the apparatus of FIG. 5 with typical drive and reference voltages applied; and there is further depicted schematically by broken line 56 the approximate surface potential configuration at the clock phase in which the voltages applied to clock lines 25 and 26 are positive and of magnitude such that the voltage $V_{A1}$ applied to clock line 25 is less than the voltage $V_{A2}$ applied to clock line 26. Further, in analogous fashion, as indicated in FIG. 3 both clock voltages are assumed to be of sufficient magnitude to cause the entire apparatus to be always in sufficiently deep depletion that the surface region is depleted of free carriers to a depth greater than the depth to which the zones 53, 54, and 55 extend. In this mode all of the ionized donors in zones 53, 54, and 55 are exposed; and so the surface potential configuration throughout the apparatus is very similar to that in FIG. 3.

More specifically with respect to the surface potential in the apparatus of FIGS. 5 and 6, there is shown in FIG. 7 a graph depicting the surface potential as a function of applied voltage and assuming no mobile charge carriers are present in the potential wells. It is seen that the only substantial difference between the curves of FIGS. 4 and 7 is that the curves in FIG. 7 are shifted to the left such that the effective knee, designated A in FIG. 7 as it was in FIG. 4, now occurs at a lower voltage, for example, about 1.5 volts, with the parameters indicated on the curve of FIG. 7. Inasmuch as it is this knee which limits the minimum allowable clock voltage which can be used to maintain operation on the linear portion of the curves, it is seen that the structure of FIGS. 5 and 6 has a first advantage that it can be operated with lower clock voltages than can the structure of FIGS. 2 and 3.

Another distinct advantage of the structure depicted in FIGS. 5 and 6 is that the N-type zones are disposed so as to underlie a portion of two adjacent electrodes and also, and very importantly, to extend entirely across the gap between those two electrodes. As disclosed in greater detail in the copending U. S. application Ser. No. 157,508, filed of even date herewith, now abandoned the inclusion of a controlled amount of positive surface charge in an N-channel device in the interelectrode spaces serves to suppress the appearance of undesirable interelectrode potential wells and/or barriers due to fringing effects of these charge coupled device electrodes.

The operation of the apparatus of FIGS. 5 and 6 in two-phase fashion is directly analogous to that of the apparatus of FIGS. 2 and 3 and so will not be further described.

Having described in detail two basic embodiments of the instant invention, it should be appreciated that a basic concept generic to this invention is the inclusion underneath the plane of the electrodes and along the information channel of a plurality of regions of immobile charge of sufficient polarity and quantity to produce under the leading portion of each electrode a barrier to charge propagation in an undesired direction. That is, the immobile charge is disposed so as to produce in the potential well under each electrode a barrier which is offset from the center of the overlying electrode and in a direction opposite to the desired direction of charge propagation.

A further basic concept and important aspect of this invention is the mode of operation in which, basically, the surface of the surface region is maintained always in deep depletion. More specifically, in the modes of operation in accordance with this invention, all of the voltages applied to the CCD field plate electrodes are of sufficient magnitude and polarity to maintain the entire surface of the storage medium along the information channel in deep depletion. In this context, it should be noted that the words "deep depletion" have a well-defined meaning in the art, i.e., "deep depletion" is that condition wherein sufficient voltage is supplied to produce a permanent inversion layer of finite depth adjacent the surface if sufficient time is allowed for the structure to come to thermal equilibrium. This is equivalent to saying that sufficient voltage is applied so that adjacent a P-type surface the quasi-fermi level for holes is above the conduction band, or alternatively, that adjacent an N-type surface, the quasi-fermi level for electrons is below the valence band. It is emphasized that "deep depletion" by itself does not indicate depletion to a depth greater than the depth to which the surface zones in accordance with this invention extend.

It will be appreciated that both of the above described basic concepts of this invention serve to distinguish the apparatus from "bucket-brigade" type charge transfer apparatus, as disclosed, for example, in the copending U. S. Pat. application Ser. No. 11,447, filed Feb. 16, 1970, and now U. S. Pat. No. 3,660,697, issued May 2, 1972, and assigned to the assignee hereof. In the "bucket-brigade" apparatus barriers of the type generic to this invention are not employed; and, perhaps more significantly, the mode of operation is entirely different. More specifically, in "bucket-brigade" apparatus, the two-phase clock voltages are not such that the entire surface of the information channel is in operation maintained at all times in deep depletion. Rather the surface portions under the electrodes in "bucket-brigade" apparatus are alternately driven into and out of deep depletion by the two-phase clock voltages.

Moreover, in charge coupled apparatus of the type depicted in FIGS. 5 and 6, in accordance with this invention the doping level of the N-regions adjacent the surface typically is orders of magnitude lower than that used in "bucket brigade" type of apparatus. For example, in the "bucket brigade" type of apparatus the N-type zones advantageously are doped degenerate, i.e., to a concentration of about $10^{21}$ per cubic centimeter, whereas in apparatus in accordance with this invention a doping level of that kind would render it virtually impossible to deplete the N-type regions of free charge carriers, to any significant depth, a condition prerequisite to operation in accordance with the instant invention. As shown in FIG. 7, apparatus in accordance with the instant invention typically employs N-type zones having concentrations of the order of $10^{17}$ per cubic centimeter disposed in a P-type background having a dopant density of the order of $5 \times 10^{14}$ acceptor impurities per cubic centimeter.

Although the invention has been described in part by making detailed reference to certain specific embodiments, such detail is intended to be, and will be understood to be, instructive rather than restrictive. It will be appreciated by those in the art that many variations may be made in the structure and modes of operation without departing from the spirit and scope of our invention as disclosed in the teachings contained hereinabove.

More specifically, it will be apparent that, although the specific disclosure has been with reference to N-channel devices, the principles are equally applicable to P-channel devices, in which case in FIG. 2 the substrate 21 would be relatively lightly doped N-type and the surface zones 33, 34, and 35 would be relatively more heavily doped N-type. Also, of course, in the complementary embodiment represented in FIGS. 5 and 6, the substrate would be relatively lightly doped N-type and the surface zones 53, 54, and 55 would be relatively more heavily doped P-type zones.

Further, it will be apparent that the teachings contained in the above-referenced copending application Ser. No. 157,508, filed of even date herewith, and disclosing the use of a uniform distribution of immobile charge along the channel to suppress the undesirable effects of interelectrode spacings, can be employed in combination with and by direct addition to the structures disclosed hereinabove, as desired.

Further, it will be appreciated that the teachings contained in the above-referenced U. S. application Ser. No. 157,507 also filed of even date herewith, disclosing the use of graded distributions of immobile charge to provide field-enhanced charge transfer at the expense of maximum storage capability at a given storage site, can also be employed instead of the uniformly doped zones disclosed herein, if desired.

Still further, and somewhat analogous to the teachings contained in the copending U. S. application, Ser. No. 128,999, filed Aug. 4, 1970, and now U. S. Pat. No. 3,697,786, issued May 2, 1972, and assigned to the assignee hereof, it will be appreciated that the apparatus of FIGS. 2, 3, 5, and 6 can be and has been operated in a "pseudo" one-phase fashion in which alternate electrodes are held at a fixed potential and the other electrodes are driven by a single clock line so that the surface potential under such other electrodes is made to vary alternately above and below the surface potential produced under the first-mentioned alternate electrodes by the fixed potential.

And further in accordance with this invention, it is recognized that MIS structures in general are sensitive to the presence of any spurious adsorbed charge on the surface thereof. Accordingly, it may be desirable in some cases to completely cover the structures depicted in FIGS. 2, 3, 5, and 6 with a protective insulating layer of sufficient thickness that any ions adsorbed on the surface thereof are held at a distance sufficiently remote from the information channel as not to cause deleterious effects therein.

Alternatively, of course, the apparatus of FIGS. 2, 3, 5, and 6 may be covered with a relatively thin insulating layer, which, in turn, is coated with a metallic layer to which a fixed potential can be applied to cancel the effects of any adsorbed charge. Still further, it will be appreciated that this last-mentioned structure is somewhat analogous to the structures disclosed in the above-referenced Smith application Ser. No. 128,999 and includes sufficient build-in asymmetry in the half-bits that an actual capactive drive arrangement wherein alternate electrodes (23 or 24) are held at a fixed potential and the entire upper metallic coating is driven with a one-phase clock potential such that capacitive coupling between the upper metallic coating and the electrodes not connected to the fixed potential causes those electrodes to be driven sufficiently that the surface potential thereunder varies alternately above and below the surface potential under the electrodes to which the fixed potential is attached. And, still further, it will be appreciated that this fixed potential referred to in this paragraph and in the preceding paragraph may be the ground potential to which the substrate also is connected; and, accordingly, these electrodes need not be connected together by a cumbersome metallic conduction path, but rather may be individually connected to the substrate outside the channel region.

What is claimed is:

1. In a charge coupled device for storage and serial transfer in a predetermined direction of information represented by varying amounts of mobile charge carriers coupled to localized potential wells and wherein the device includes a semiconductive storage medium whose bulk is of a first conductivity type and which has a major surface, an insulating layer disposed over and contiguous with said surface, and a plurality of spaced, localized field plate electrodes disposed successively over said layer so as to form a path along said predetermined direction, the improvement being that along said path and beneath each said electrode there is disposed a localized surface zone of about 2000 Angstroms depth of the same conductivity type but higher impurity concentration than the bulk, and limited in lateral extent so as to lie essentially entirely under a limited portion of said electrode and disposed asymmetrically toward the input end with respect to the lateral geometric center of said electrode, the difference in impurity concentrations being sufficient that in response to successive application of operating voltages to the electrodes there are produced under the electrodes localized potential wells having a lower depth in the portions underlying the localized zones, whereby there is favored the transfer of mobile charge carriers in the predetermined direction along said path.

2. Apparatus as recited in claim 1 further comprising:

means for alternately applying first and second voltages to said electrodes sufficient to cause the storage and advance of mobile charge along said path.

3. Apparatus as recited in claim 2 wherein the first and second voltages are sufficient to maintain the surface of the storage medium along the information channel in deep depletion.

4. Apparatus as recited in claim 1 wherein the first type semiconductivity is P-type and the apparatus is adapted for N-channel operation.

5. Apparatus as recited in claim 4 wherein the concentration of P-type impurities in the bulk portion is about $5 \times 10^{14}$ acceptors per cubic centimeter and the concentration of impurities in the more heavily doped surface zones is about $10^{17}$ acceptors per cubic centimeter.

6. Apparatus as recited in claim 1 further comprising:

a pair of conduction paths, each conduction path being connected to a different one of every second electrode in the succession of electrodes; and two-phase circuit means coupled to said conduction paths for successively biasing the electrodes for causing the storage and advance of mobile charge.

7. Apparatus as recited in claim 6 wherein the voltages supplied by the two-phase circuit means are sufficient to maintain the surface of the storage medium along the information channel in deep depletion.

8. Apparatus as recited in claim 7 wherein the voltages supplied are sufficient to deplete those portions of the storage medium along the information channel to a depth greater than the depth to which the localized zones extend into the semiconductive bulk.

9. A charge coupled device in accordance with claim 1 further characterized in that the localized zones have been ion implanted to increase the impurity concentration therein.

* * * * *

UNITED STATES PATENT OFFICE

CERTIFICATE OF CORRECTION

Patent No. 3,789,267 Dated January 29, 1974

Inventor(s) Robert H. Krambeck, Robert H. Walden

It is certified that error appears in the above-identified patent and that said Letters Patent are hereby corrected as shown below:

Col. 1, line 19, change "May" to --March--.

Col. 3, line 54, after "$14_{n-1}$" insert --$13_n$--.

Col. 7, line 15,16, should be:

$$--V_A = \phi_s + V_1 \left(\frac{\phi_s}{\phi_{s1}}\right)^{1/2}, \quad x_d \leq x_1--$$

Col. 11, line 23, after "34" add --also--;

line 52, after "immobile" insert --charge--;

line 56, after "by" insert --a--.

Col. 14, line 55, delete "May 2, 1972" and substitute therefor --October 10, 1972--.

Signed and sealed this 18th day of June 1974.

(SEAL)

Attest:

EDWARD M.FLETCHER,JR.
Attesting Officer

C. MARSHALL DANN
Commissioner of Patents